Feb. 2, 1971  H. N. BOGART  3,559,447
INCREMENTAL DIE CONSTRUCTION WITH INTERNAL FLOW PASSAGES
FOR LOCALIZED TEMPERATURE CONTROL
Filed Sept. 26, 1968  5 Sheets-Sheet 1

INVENTOR:
Harold N. Bogart.
BY
ATTORNEYS.

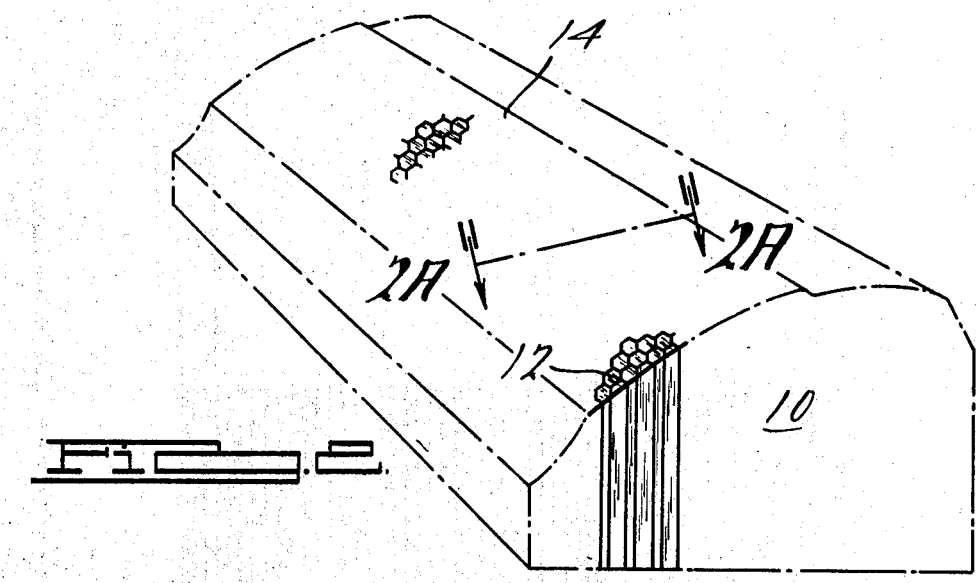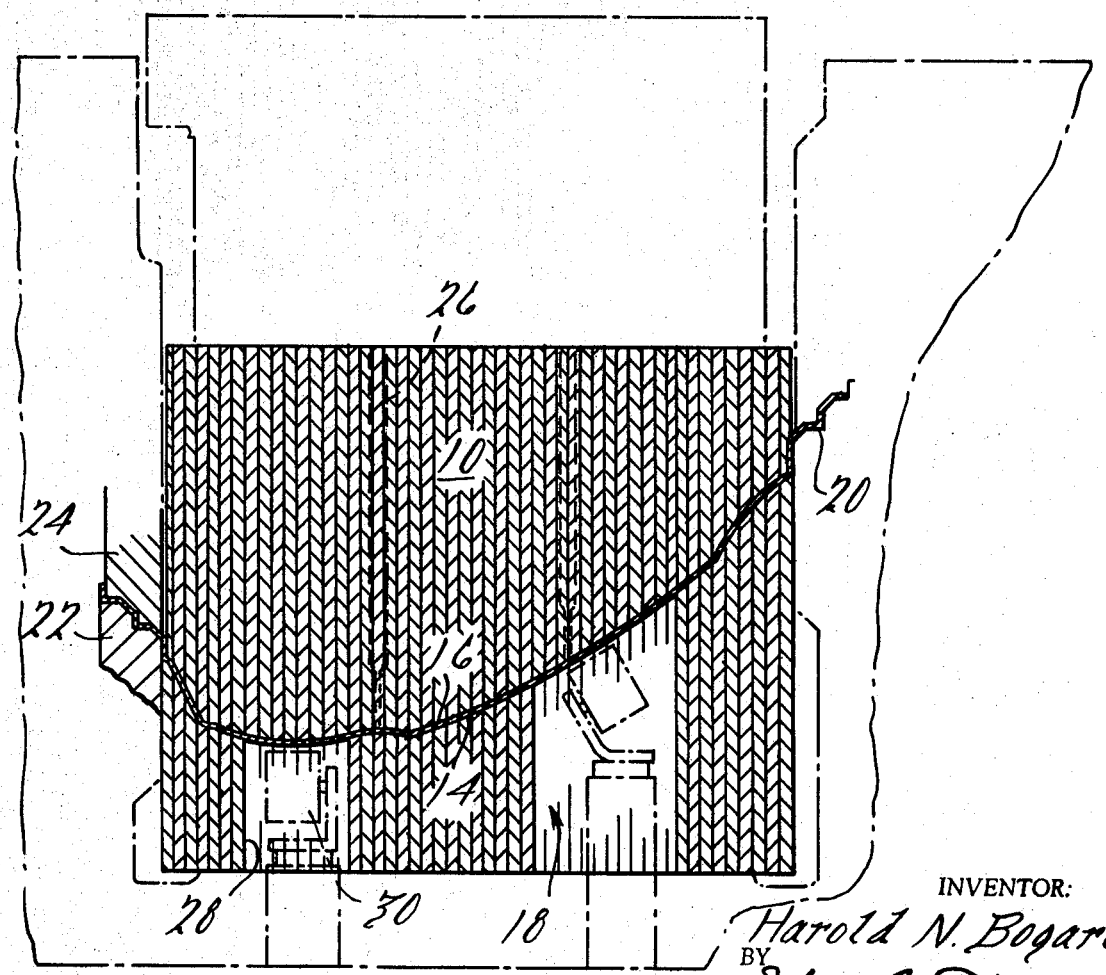

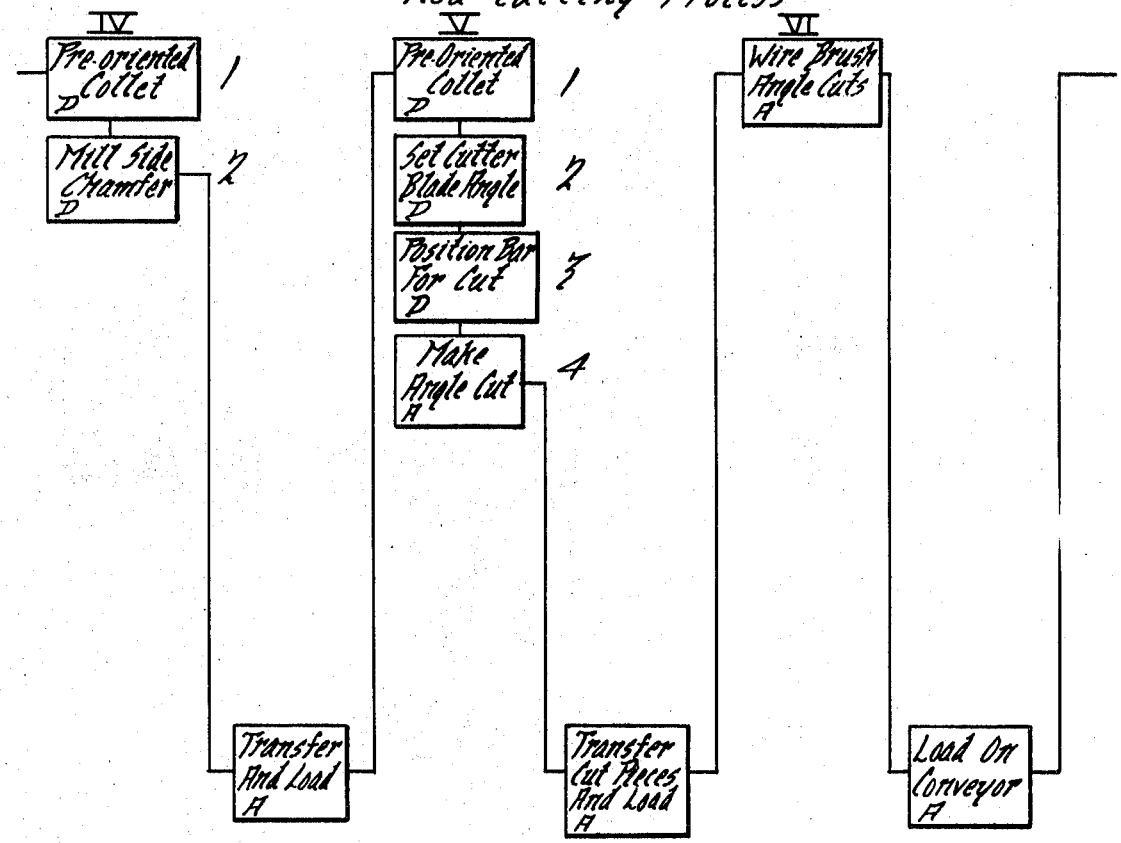
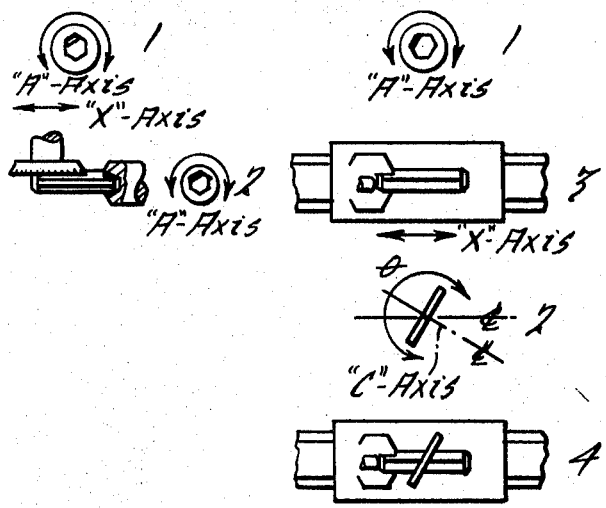
FIG. 4B.

Numerically Controlled Incremental Construction Of Rough Machined Casting Equivalents
Rod Cutting Process
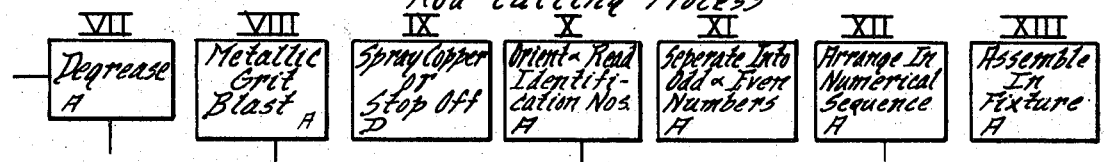
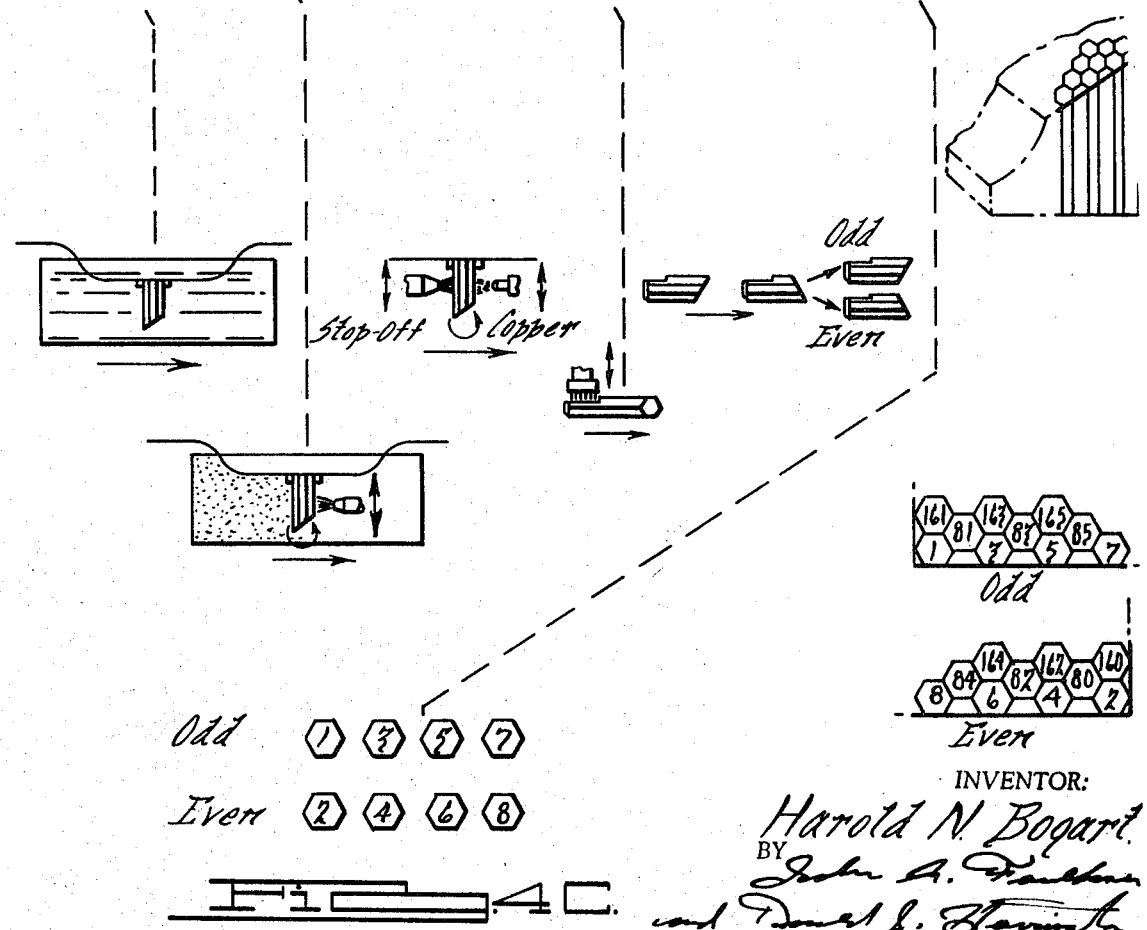
FIG. 4C
INVENTOR:
Harold N. Bogart
BY
ATTORNEYS United States Patent Office 3,559,447
Patented Feb. 2, 1971

3,559,447
INCREMENTAL DIE CONSTRUCTION WITH INTERNAL FLOW PASSAGES FOR LOCALIZED TEMPERATURE CONTROL
Harold N. Bogart, Farmington, Mich., assignor to Ford Motor Company, Dearborn, Mich., a corporation of Delaware
Filed Sept. 26, 1968, Ser. No. 762,960
Int. Cl. B21d 37/00, 37/16
U.S. Cl. 72—342                                                    4 Claims

ABSTRACT OF THE DISCLOSURE

A die comprising two complementary die sections, each section comprising a plurality of hexagonal rods situated in registry, the lengths of the rods being predetermined prior to assembly, said rod ends being contiguous and forming increments of a continuous die surface, and a fluid flow passage formed in part by the foreshortening or removal of one or more selected rods, thereby permitting the flow of temperature controlling fluid through selected areas of the die section.

GENERAL DESCRIPTION OF THE INVENTION

My invention is adapted especially for incremental die sections comprising hexagonal rods arranged in registry in the manner described in copending application Ser. No. 749,685, filed Aug. 8, 1968, which application is assigned to the assignee of my invention.

Each of the rods of each section is precut to a precalibrated length. The angle of the cut is determined so that the end surface of the rod will form an increment of the die surface on the die section. One part of the cut rod is used as an increment of one die section, and the other part of the same rod is used to form a corresponding increment of the complementary section.

In certain die casting operations, especially in die casting that involves plastic molding, it becomes necessary to provide localized temperature control. Certain isolated regions of the die casting die, for example, might become overheated in the die casting operation due to the configuration of die surfaces or due to the lack of a suitable heat flow path in certain regions of the die.

By employing the improvement of my invention, it is possible to obtain localized cooling. My improvement comprises a flow tube that may be inserted into a cavity that is created by foreshortening one or more of the incremental rods that comprise the die section. The tube is adapted to conduct fluid into or out of the cavity so that heat may be carried from the surrounding hexagonal rods through the fluid medium. In some circumstances, it may be necessary to heat, rather than chill, a localized region of the die section. Heat may be applied to that localized section by circulating heated liquid through the tube so that a reversal in the direction of heat flow may take place.

The base ends of the hex rods that surround the opening may be chamfered across their sides, either by milling the chamfers individually or by generating them during a turning operation. When the hexagonal rods are assembled to form a die section, these chamfers form an interconnected network of ports or passages, which define a flow path for the fluid used for temperature control. The number of flow tubes can be varied, thereby providing a control for the temperature level in specific areas of the die section. Further, the diameter of the tube may be varied within the limitations of the area of the cross section of the void created upon the removal of the hexagonal rods, thereby increasing or decreasing the flow volume. Also the direction of the flow can be changed as desired to effect proper temperature stabilization.

The chamfering of the selected rods, the foreshortening of selected rods to create a void, and the location of supporting base space structure for the tubes is done under the control of numbers during the numerically controlled machining and assembly methods for the rods.

BRIEF DESCRIPTION OF THE FIGURES OF THE DRAWINGS

FIG. 2 is an isometric view of a die section comprised of registering hexagonal rods.

FIG. 3 is a cross sectional view of complementary die sections, one of which is the die section of FIG. 2.

FIGS. 4A, 4B and 4C is a schematic illustration of a process flow chart for a numerically controlled manufacturing method used to manufacture and assemble the hexagonal rods of which the die sections are comprised.

PARTICULAR DESCRIPTION OF THE INVENTION

FIG. 2, numeral 10, designates generally the punch half of a pair of die sections for forming sheet metal. For the purpose of this description, I will describe a complementary pair of metal forming dies although it should be understood that the invention can be applied readily also to die casting die sections.

Figure 2A:
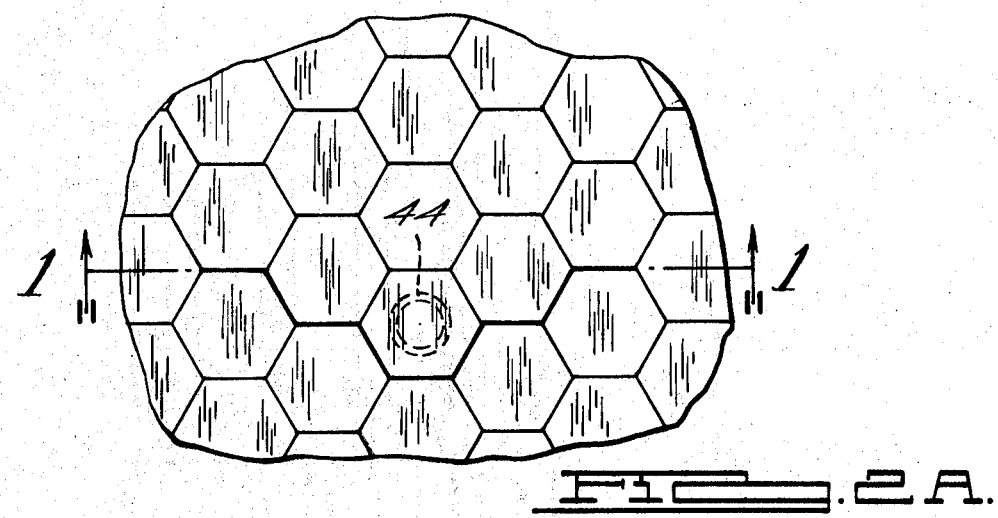
FIG. 2A is a plan view of the die section of FIG. 2 as seen from the plane of section line 2A—2A of FIG. 2.

The die section 10 comprises a plurality of hexagonal rods 12 that are nested together in assembled relationship as indicated best in FIG. 2A. Each rod is machined to a predetermined length, and the angle formed by the end surface of each rod with respect to the rod axis is precalibrated so that the surface will form an incremental tangent plane to the finished die surface at the point of intersection of the rod axis with the plane of the die surface. The end surfaces of the rods are arranged in contiguous relationship so that they define a rough casting equivalent of the die surface.

The precalibrated die surface is indicated by reference character 14. This surface conforms to the surface 16 of a companion die surface 18 as shown in FIG. 3. Die section 18, like die section 10, is formed of incremental rods which are nested together in the same manner in which the rods of FIG. 2A are nested. Each rod 12 of FIG. 10 has a complementary rod in die section 18 of FIG. 3. The angle of the surface of rod 12 is identical to the angle of the surface of the complementary rod section for the die 18. A clearance exists between the surfaces 16 and 14 to accommodate the sheet metal stock shown in FIG. 3 at 20. The margins of the stock 20 can be held in a pair of registering binder housings 22 and 24 which surround the die section 18 and 10, respectively.

It is necessary to permit the escape of air from entrapped regions between the sheet metal 20 and the surface 14 as the die section 10 is brought into registry with the die section 18 during the stamping operation.

Figure 1:
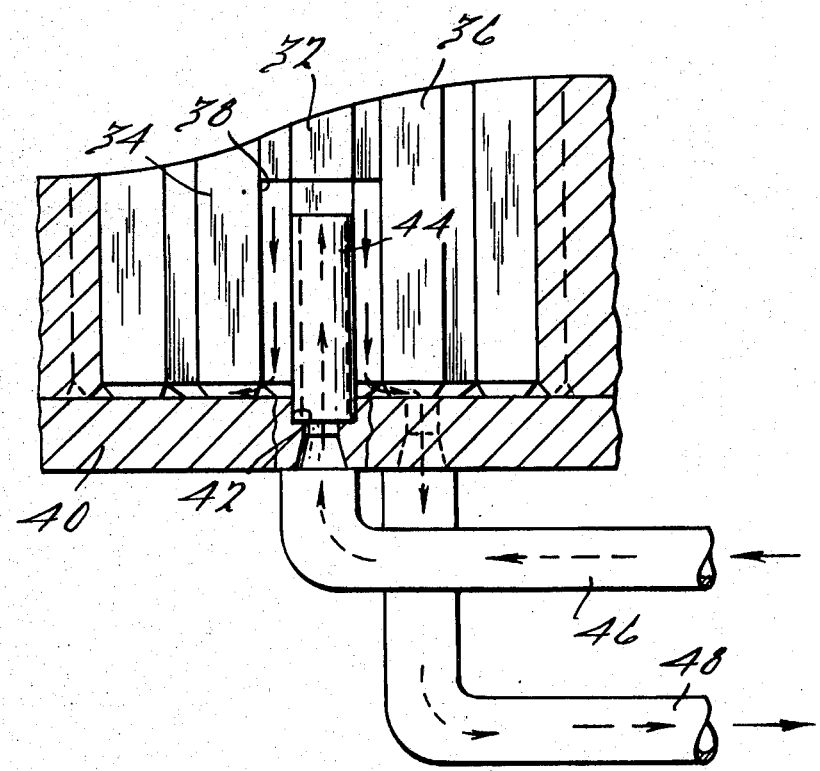
FIG. 1 shows a portion of a die section in cross section with the temperature controlling liquid flow path extending into and out of one region of the die section.

For this purpose, one or more rods may be foreshortened at selected regions of the die section as indicated, for example, in FIG. 1. The foreshortened rod in FIG. 1 is shown at 32. The rods that are adjacent to rod 32 are shown at 34 and 36. All the rods are bonded together to form an integral assembly as indicated in 2A. By foreshortening one of the rods, a cavity is formed as indicated at 38.

FIG. 3 also shows identical openings 28 which accommodate knock-out rollers 30. These rollers can be moved upwardly after the die sections are drawn apart, thereby facilitating the removal of the formed sheet metal 20.

The rods in the assembly shown in FIG. 1 are bonded on a base plate 40 which has formed therein a recess 42 within which is fitted a flow directing tube 44. This tube extends within the recess 38. A suitable fluid conduit 46 communicates with the interior of the tube 44 and the base plate 40. This may be a fluid flow supply conduit.

The adjacent rods, such as those shown at 34 and 36, are chamfered at their ends to form a network of grooves when the rods are assembled on the base plate 40. These grooves form a hexagonal interlocking pattern, and they communicate with the recess 38. Fluid passing through the conduit 46 and through the flow tube 44 may be circulated to the upper regions of cavity 38. It then is caused to flow downwardly as indicated by the directional arrows shown at FIG. 1. The fluid communicates then with the grooves formed by the chamfers at the base of the rod 34 and 36 as well as the other adjacent rods. These grooves in turn communicate with a return conduit 48 which communicates with the grooves through the base plate 40.

It is possible, of course, to reverse the directional flow if this is required by a particular application.

If the fluid circulated through the conduits 46 and 48 is cooler than the temperature of the dies during operation, the region directly adjacent the tube 44 is chilled. This chilling action provides a localized cooling effect on the surface of the die. Conversely, if localized heating is required, the temperature of the fluid supplied through the conduit 46 and 48 can be higher than the operating temperature of the die section.

Figure 4A:
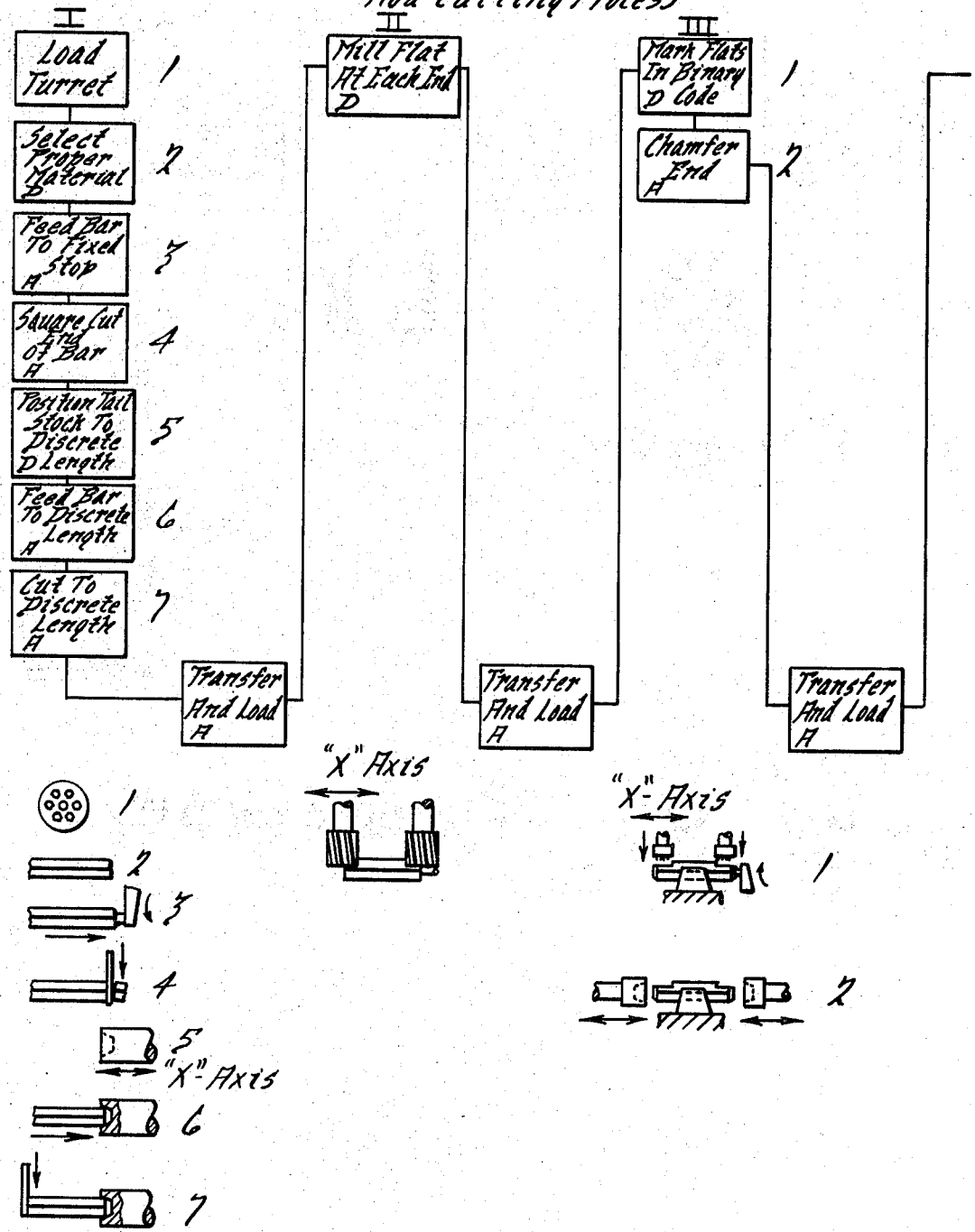

An automated system for forming the hexagonal rods used in constructing the die sections is illustrated schematically in FIGS. 4A, 4B and 4C. These figures illustrate schematically a transfer line of rod-producing equipment into which raw material in the form of hex bar stock can be introduced and fed through several Stations, numbered I through XIII. The rods finally emerge from the terminating end of the system as hex rod elements of varying dimensional characteristics.

The operation that occurs at the several stations is initiated and controlled primarily through numerical control data, although this is supplemented with automatic cycling devices. The required numerical data is obtained as the output of a general purpose computer, and the data controls the function of those stations where varying dimensional characteristics of the hex rods require continual adjustment of the machine slides or motions as the hex rod elements pass through the transfer line.

At Station I shown at FIG. 4A the hexagonal bar stock is loaded into the openings of the material turret, whereas the varying hardness and chemical characteristics can be selected if such variety of materials is required by the particular design. The material turret, on command from the control system, rotates to present the proper hex rod material to the rod cut-off blade. The bar stock is squared off by removing a minimum amount of stock material after the bar stock is fed to a fixed stop as indicated in Substation 3. A tailstock, as shown in Substation 5, is adjusted to the proper X-axis position. This adjustment occurs in response to numerical data. The bar then is engaged with the tailstock in Substation 6, and in Substation 7 the rod is cut to length.

An automated transfer system transfers the cut hex rods to Station II where the rods are clamped into position against an end stop. Two milling cutters simultaneously pass across each end generating a flat as shown. One mill cutter is preset in relation to the end stop, and the other cutter is adjusted in the X-axis direction. The amount of the adjustment is preprogrammed to accommodate varying lengths of the rods. The adjustment is made in response to computed numerical input data.

The machined flats provide an area for impressing thereon an identification number at each end of the bar. This stamping occurs in Station III. The marking head shown at Station III is adjustable also in an X-axis direction in response to numerical data to accommodate the spread between the flats.

Upon retraction of the numbering head, two cutters are immediately actuated to chamfer each end of the selected rods. The rods numbered 34 and 36 in FIG. 1 would be two of the rods selected for the chamfering operation. This creates a network of grooves formed at the base of the die section shown in FIG. 1, which grooves accommodate the flow of fluid into or out of the recess 38. Other rods that are removed from the region of the tube 44 would not be chamfered in this way. Those rods that do not require chamfering bypass Station III and proceed immediately to Station IV, or to Station V.

If a vent passage extending through the die section is required, the appropriate rod is side chamfered to provide an opening when the rods are assembled in nested relationship as indicated in FIG. 2.

In Station V the rods are transferred to a collet chuck which is rotatably oriented with respect to its A-axis and linearly positioned in respect to the X-axis in response to numerical data. A cut-off blade as shown in Substation 2 is adjusted to its proper angle about the Z-axis in response to numerical data. The cut-off blade then is automatically actuated to cut through the rod. This angular cut through the rod produces two rods, one of which represents a component of one die section and the other of which represents a complementary component of the other die section. The faces generated by the cut represent a portion of the desired surface equal to the cross sectional area of the hex rod, the two faces of the two rods produced being complementary to each other.

The rods are wire brushed and degreased at Stations VI and VII. At Station VIII selected rods are grit blasted to prepare the surface for a spray coating of copper. The spraying operation occurs in Station IX. If a particular rod is to be removed from the assembly, it is sprayed with "stop-off" material rather than with copper. The selection of copper or "stop-off" material will be made in response to program output data.

The "in-process" rods are identified in Station X and oriented angularly. They are separated at Station XI into two groups. The separate groups are arranged and assembled in Stations XII and XIII.

The rods, such as those shown at 32 in FIG. 1, would be selected by the numerical programmed data and cut to the proper length in Station I. Again the numerical program data in Station V, Substation 3, would properly position rod 32, as well as other rods that are foreshortened to provide the fluid cavity 38. This will allow the cut-off blade to cut the rod to the proper X-axis position to permit the formation of the cavity 38 after the rods are assembled in Station XIII.

Having thus described a preferred form of my invention, what I claim and desire to secure by United States Letters Patent is:

1. An incremental die construction having an arbitrary surface contour comprising a plurality of hexagonal rods assembled in nested relationship, said rods being individually cut to a predetermined length, the end surface of each rod forming an increment of a die surface, each end surface having a surface normal in a discrete, predetermined direction, the end surfaces of said rods being contiguous and forming incremental areas of a rough machined casting equivalent, selected rods being foreshortened to provide an internal cavity of said die section, fluid flow passage means defined in part by said cavity for conducting liquid into and out of the inner region of said die section, whereby the temperature of the portion of the die section adjacent said flow means can be controlled.

2. The combination as set forth in claim 1 wherein selected rods of said die section are chamfered at their ends opposite to the end that forms said incremental surface area, said chamfered ends forming fluid flow grooves that communicate with said recess, said grooves forming a part of said fluid flow passage.

3. The combination as set forth in claim 1 wherein said conduit means includes a flow tube inserted within the cavity in said die section created by the foreshortening of selected rods, said flow tube accommodating the flow of liquid in one direction through said cavity and the portion of the cavity on the exterior of said flow tube accommodating flow in the opposite direction.

4. The combination as set forth in claim 2 wherein said conduit means including a flow tube inserted within the cavity in said die section created by the foreshortening of selected rods, said flow tube accommodating the flow of liquid in one direction through said cavity and the portion of the cavity on the exterior of said flow tube accommodating flow in the opposite direction.

References Cited
UNITED STATES PATENTS

| | | | |
|---|---|---|---|
| 1,251,128 | 12/1917 | Steedman | 72—342 |
| 1,336,388 | 4/1920 | Youngberg | 72—475 |
| 2,118,018 | 5/1938 | Swanson | 72—342 |
| 2,332,360 | 10/1943 | Wakefield | 76—107 |
| 2,396,218 | 3/1946 | Watters | 72—342 |
| 3,277,535 | 10/1966 | Rupert | 18—44 |

LOWELL A. LARSON, Primary Examiner

U.S. Cl. X.R.

72—475

UNITED STATES PATENT OFFICE
CERTIFICATE OF CORRECTION

Patent No. 3,559,447     Dated February 2, 1971

Inventor(s) H. N. Bogart

It is certified that error appears in the above-identified patent and that said Letters Patent are hereby corrected as shown below:

Column 4, line 58, cancel "construction" and substitute --section--.

Signed and sealed this 7th day of September 1971.

(SEAL)
Attest:

EDWARD M. FLETCHER, JR.
Attesting Officer

ROBERT GOTTSCHALK
Acting Commissioner of Paten